US012254815B2

(12) United States Patent
Lin et al.

(10) Patent No.: US 12,254,815 B2
(45) Date of Patent: Mar. 18, 2025

(54) METHOD FOR REDUCING COLOR EDGE PHENOMENON OF DISPLAY PANEL

(71) Applicant: ASUSTeK COMPUTER INC., Taipei (TW)

(72) Inventors: Chen-Wei Lin, Taipei (TW); Chin-An Tseng, Taipei (TW); Yung-Ming Huang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 18/500,374

(22) Filed: Nov. 2, 2023

(65) Prior Publication Data

US 2024/0265845 A1 Aug. 8, 2024

(30) Foreign Application Priority Data

Feb. 2, 2023 (TW) ................................ 112103727

(51) Int. Cl.
*G09G 3/20* (2006.01)

(52) U.S. Cl.
CPC ... *G09G 3/2096* (2013.01); *G09G 2300/0452* (2013.01); *G09G 2300/0465* (2013.01); *G09G 2320/0242* (2013.01); *G09G 2320/0626* (2013.01)

(58) Field of Classification Search
None
See application file for complete search history.

(56) References Cited

U.S. PATENT DOCUMENTS

| | | | | |
|---|---|---|---|---|
| 10,283,035 | B2 * | 5/2019 | Kobayashi | G09G 3/2022 |
| 2014/0184668 | A1 * | 7/2014 | Im | G09G 3/3426 345/694 |
| 2015/0356903 | A1 * | 12/2015 | Lee | G09G 3/2003 345/600 |
| 2020/0110200 | A1 * | 4/2020 | Zang | G02B 5/003 |
| 2020/0302865 | A1 * | 9/2020 | Lu | G09G 3/2003 |
| 2021/0049980 | A1 * | 2/2021 | Bae | G09G 5/10 |
| 2021/0225245 | A1 * | 7/2021 | Chen | G09G 3/20 |

FOREIGN PATENT DOCUMENTS

| | | | |
|---|---|---|---|
| CN | 106530994 | A | 3/2017 |
| CN | 106530994 | B | 12/2018 |
| CN | 111383569 | A | 7/2020 |
| CN | 110364546 | B | 8/2021 |
| CN | 214012943 | U | 8/2021 |
| CN | 114023242 | A | 2/2022 |
| CN | 114613309 | A | 6/2022 |
| CN | 115084186 | A | 9/2022 |
| TW | 202137186 | A | 10/2021 |

* cited by examiner

*Primary Examiner* — Andre L Matthews
(74) *Attorney, Agent, or Firm* — McClure, Qualey & Rodack, LLP

(57) ABSTRACT

A method for reducing a color edge phenomenon of a display panel is provided. The method is applicable to a display panel including a plurality of pixel units. The method includes: performing pixel adjustment on the pixel units at edges of the display panel. Each pixel unit includes at least three sub-pixels: a first sub-pixel, a second sub-pixel, and a third sub-pixel. By adjusting positions, areas, or brightness of the sub-pixels, the color edge phenomenon of the display panel is effectively reduced or avoided.

14 Claims, 6 Drawing Sheets

METHOD FOR REDUCING COLOR EDGE PHENOMENON OF DISPLAY PANEL

CROSS-REFERENCE TO RELATED APPLICATION

This application claims the priority benefit of Taiwan application serial No. 112103727, filed on Feb. 2, 2023. The entirety of the above-mentioned patent application is hereby incorporated by reference herein and made a part of the specification.

BACKGROUND OF THE INVENTION

The disclosure relates to a method for reducing a color edge phenomenon on a window edge of a display panel.

DESCRIPTION OF THE RELATED ART

In an organic light-emitting diode (OLED) display device, due to the asymmetric arrangement of the panel pixel design and the high-density characteristic of the light-emitting diode, when a contrast difference of the screen window edge is large, it is likely that human eyes fail to effectively homogenize red-green-blue (RGB) lights, causing a so-called color-edge effect. In an embodiment, in an image with the color edge phenomenon seen on the OLED display device, due to different pixel arrangement manners, 1-pixel-width red lines visible to naked eyes appear at the top, green lines appear at the bottom of the image, less obvious yellow lines appear at the left, and less obvious blue lines appear at the right. The edge line color varies depending on the pixel design.

BRIEF SUMMARY OF THE INVENTION

The disclosure provides a method for reducing a color edge phenomenon of a display panel. The method is applicable to a display panel including a plurality of pixel units. The method includes: performing pixel adjustment on the pixel units at edges of the display panel. Each pixel unit includes at least three sub-pixels: a first sub-pixel, a second sub-pixel, and a third sub-pixel, to adjust positions, areas, or brightness of the sub-pixels.

In summary, the disclosure provides a method for reducing a color edge phenomenon of a display panel. The method is to reduce the color edge of the window or screen edge of the display panel by adjusting the positions, areas, or brightness of the sub-pixels in the pixel units at the edges of the display panel, so that human eyes see the correct color on visual effects after the chroma of the color edge is effectively adjusted, and then the color edge is homogenized by the human eyes, to avoid the color edge phenomenon of the edge pixels due to the overly unbalanced RGB chroma. Therefore, the disclosure effectively reduces or avoids the color edge phenomenon to improve the display effect of the display panel and user experience.

DETAILED DESCRIPTION OF THE EMBODIMENTS

The following describes the embodiments of the disclosure in conjunction with reference to the accompanying drawings. In addition, the drawings in the embodiments omit some components or structures to clearly show the technical features of the disclosure. In these drawings, the same number represents the same or similar component or circuit. It is to be understood that although the terms "first", "second", and the like are used herein to describe various components, portions, regions, or functions. However, these components, portions, regions, and/or functions are not limited by these terms. These terms. are used only to separate one component, portion, region, or function from another component, portion, region, or function.

Figure 1:
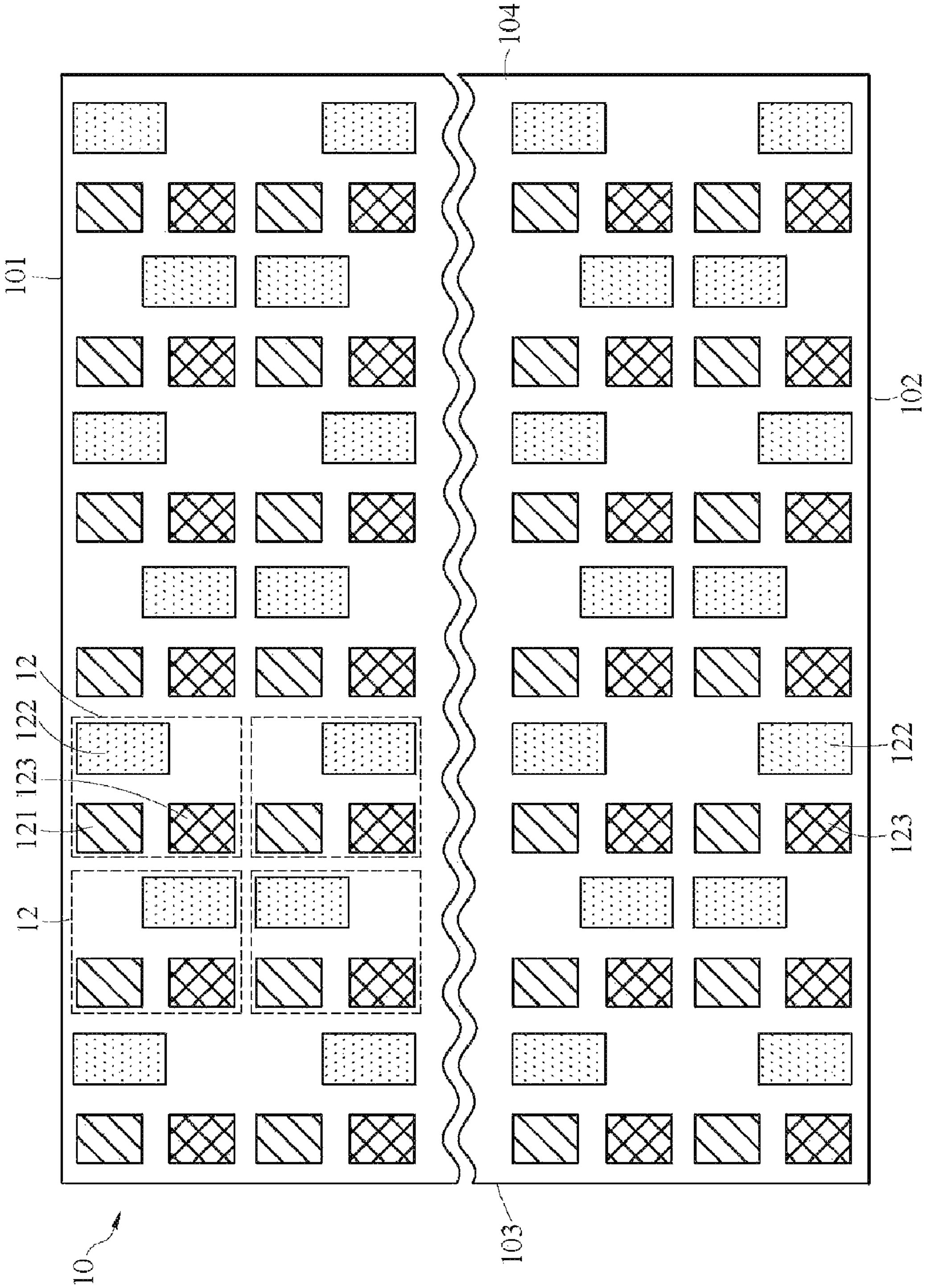
FIG. 1 is a schematic structural diagram of a general display panel.

Referring to FIG. 1, a display panel 10 includes a plurality of pixel units 12, and each pixel unit 12 includes at least three sub-pixels: a first sub-pixel 121, a second sub-pixel 122, and a third sub-pixel 123. The display panel 10 includes a first edge 101 and a second edge 102 that are opposite to each other, and a third edge 103 and a forth edge 104 that are opposite to each other. In the display panel of this embodiment, the first edge 101 is an upper edge of the display panel 10, the second edge 102 is a lower edge of the display panel 10, the third edge 103 is a left edge of the display panel 10, and the fourth edge 104 is a right edge of the display panel 10. The first sub-pixel 121 is a red sub-pixel, the second sub-pixel 122 is a blue sub-pixel, and the third sub-pixel 123 is a green sub-pixel. Therefore, the first edge 101 (upper edge) of the display panel 10 presents an ordered alternate arrangement of the first sub-pixel 121 and the second sub-pixel 122, resulting in a red color edge; and the second edge 102 (lower edge) of the display panel 10 presents an ordered alternate arrangement of the third sub-pixel 123 and the second sub-pixel 122, resulting in a green color edge. The specific color of the color edge varies depending on the pixel arrangement.

Figure 2:
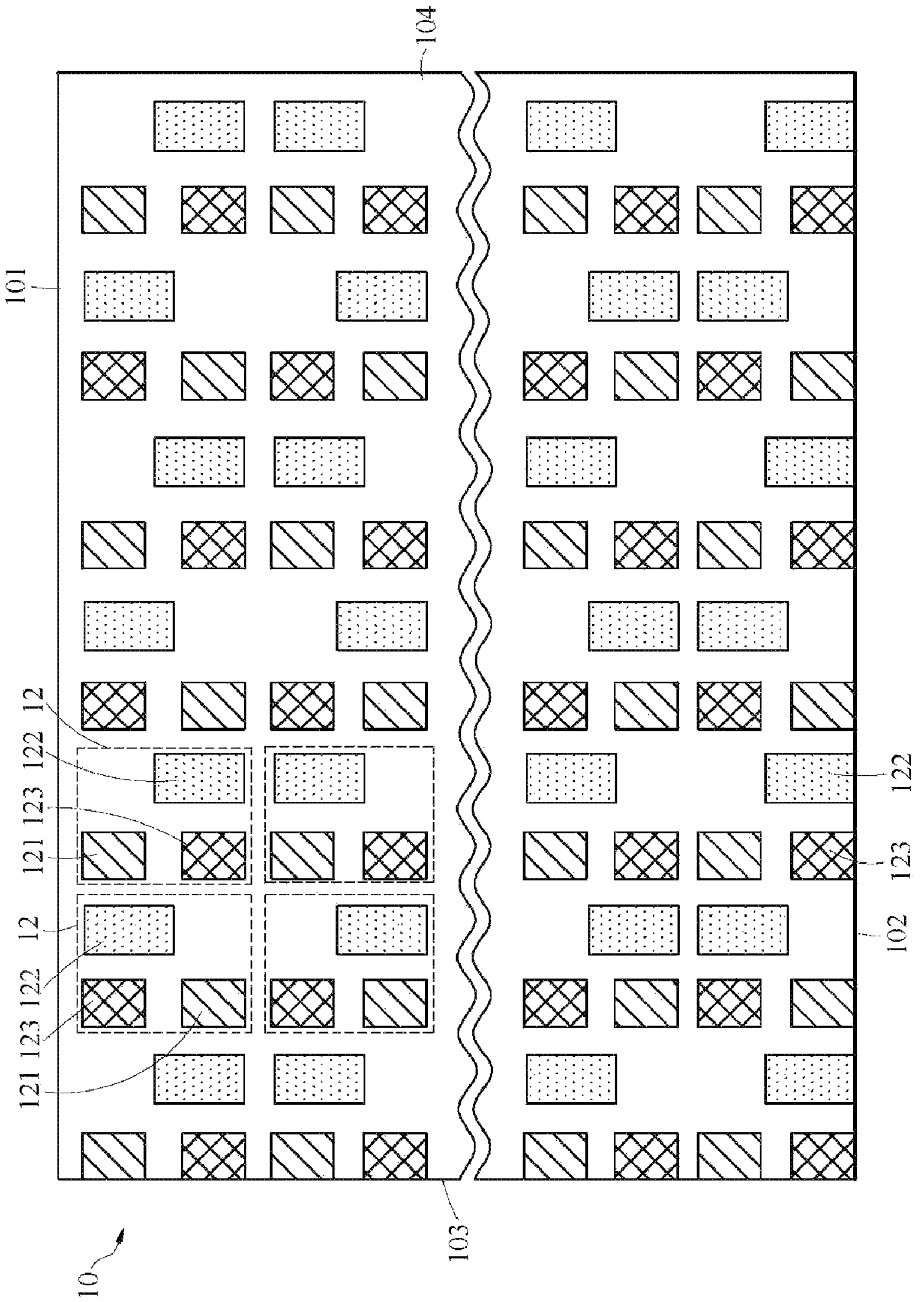
FIG. 2 is a schematic structural diagram of a display panel for adjusting arrangement positions of sub-pixels according to an embodiment of the disclosure.

In the disclosure, the color edge of the window edge of the display panel 10 in FIG. 1 is resolved by adjusting arrangement positions of the sub-pixels. Referring to FIG. 2, the display panel 10 includes a plurality of pixel units 12, and each pixel unit 12 includes at least three sub-pixels: a first sub-pixel 121, a second sub-pixel 122, and a third sub-pixel 123. In this embodiment, the first sub-pixel 121 is a red sub-pixel, the second sub-pixel 122 is a blue sub-pixel, and the third sub-pixel 123 is a green sub-pixel. The method in the disclosure is to perform pixel adjustment on the pixel units 12 at edges of the display panel 10 to adjust the positions of the first sub-pixel 121 and the third sub-pixel 123. The first sub-pixel 121, the second sub-pixel 122, and the third sub-pixel 123 at the edges of the display panel 10 are adjusted to be alternately arranged, so that the first sub-pixel 121, the second sub-pixel 122, and the third sub-pixel 123 at the edges are arranged uniformly to present an ordered alternate arrangement of the first sub-pixel 121, the second sub-pixel 122, and the third sub-pixel 123. A brightness ratio of the first sub-pixel 121, the second sub-pixel 122, and the third sub-pixel 123 at the edges of the display panel 10 is 1:1:1. In other words, the ordered alternate arrangement of the third sub-pixel 123, the second sub-pixel 122, and the first sub-pixel 121 is presented from left to right at the first edge 101 (upper edge) of the display panel 10, and the ordered alternate arrangement of the third sub-pixel 123, the second sub-pixel 122, and the first sub-pixel 121 is also presented from left to right at the second edge 102 (lower edge) of the display panel 10. Therefore, the human eyes see the correct white on visual effects after the color edge is effectively homogenized, to avoid the red edge or the green pixel to be overly unbalanced, to reduce or eliminate the color edge.

Figure 3:
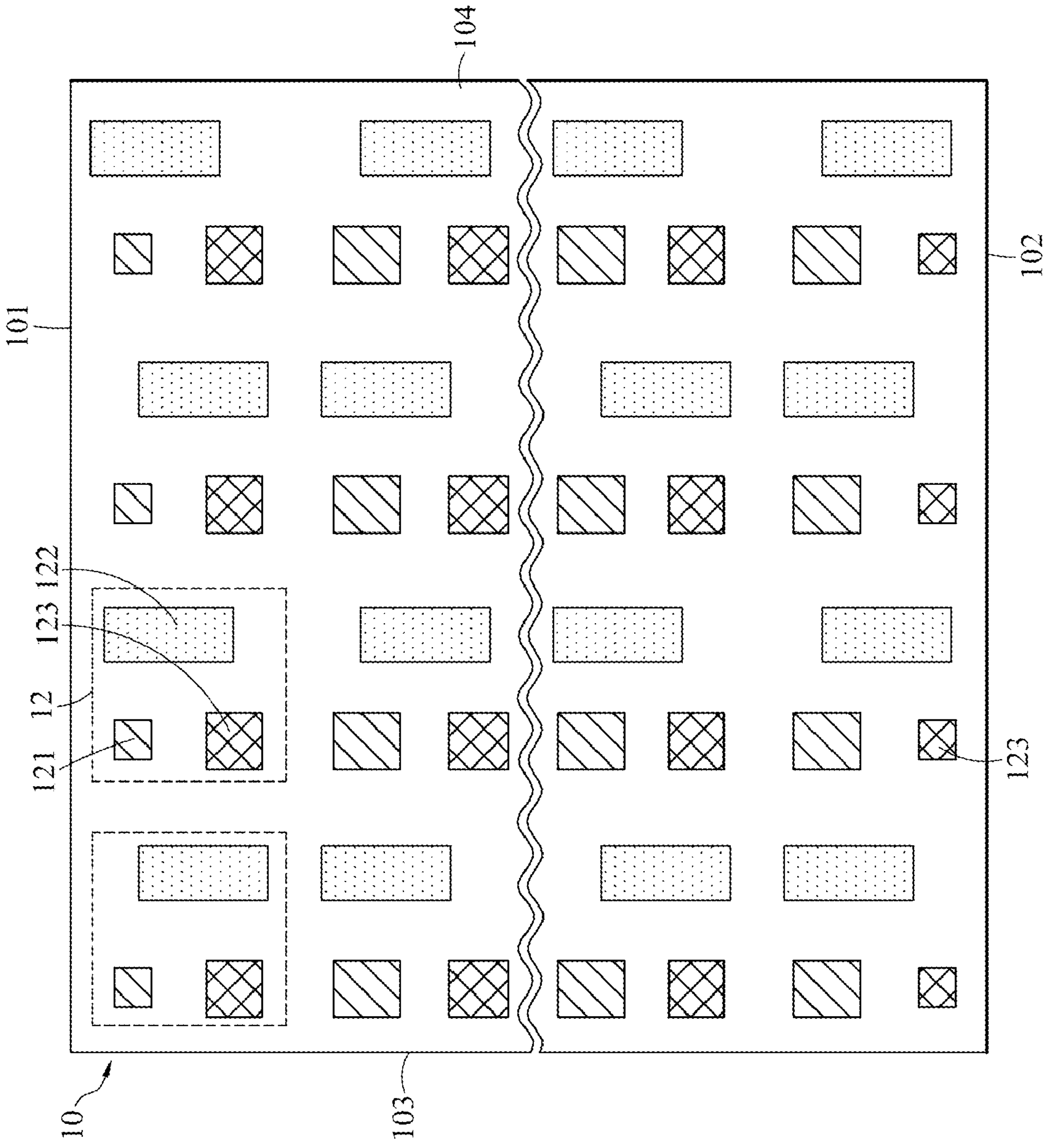
FIG. 3 is a schematic structural diagram of a display panel for adjusting areas of sub-pixels according to an embodiment of the disclosure.

In the disclosure, the color edge of the window edge of the display panel in FIG. 1 is resolved by adjusting areas of the sub-pixels. Referring to FIG. 3, the display panel 10 includes a plurality of pixel units 12, and each pixel unit 12 includes at least three sub-pixels: a first sub-pixel 121, a second sub-pixel 122, and a third sub-pixel 123. In this embodiment, the first sub-pixel 121 is a red sub-pixel, the second sub-pixel 122 is a blue sub-pixel, and the third sub-pixel 123 is a green sub-pixel. The method in the disclosure is to perform pixel adjustment on the pixel units 12 at edges of the display panel 10 to adjust the areas of the first sub-pixel 121 and the third sub-pixel 123. The areas of the first sub-pixel 121 at the first edge 101 (upper edge) of the display panel 10 and the third sub-pixel 123 at the second edge 102 (lower edge) of the display panel 10 are reduced, so that the first sub-pixel 121 and the third sub-pixel 123 at the edges have smaller areas. The areas of the first sub-pixel 121 and the third sub-pixel 123 are reduced by at least 10%, as shown in FIG. 3, to reduce the color edge phenomenon by reducing the sizes of the sub-pixels at the two edges.

Figure 4:
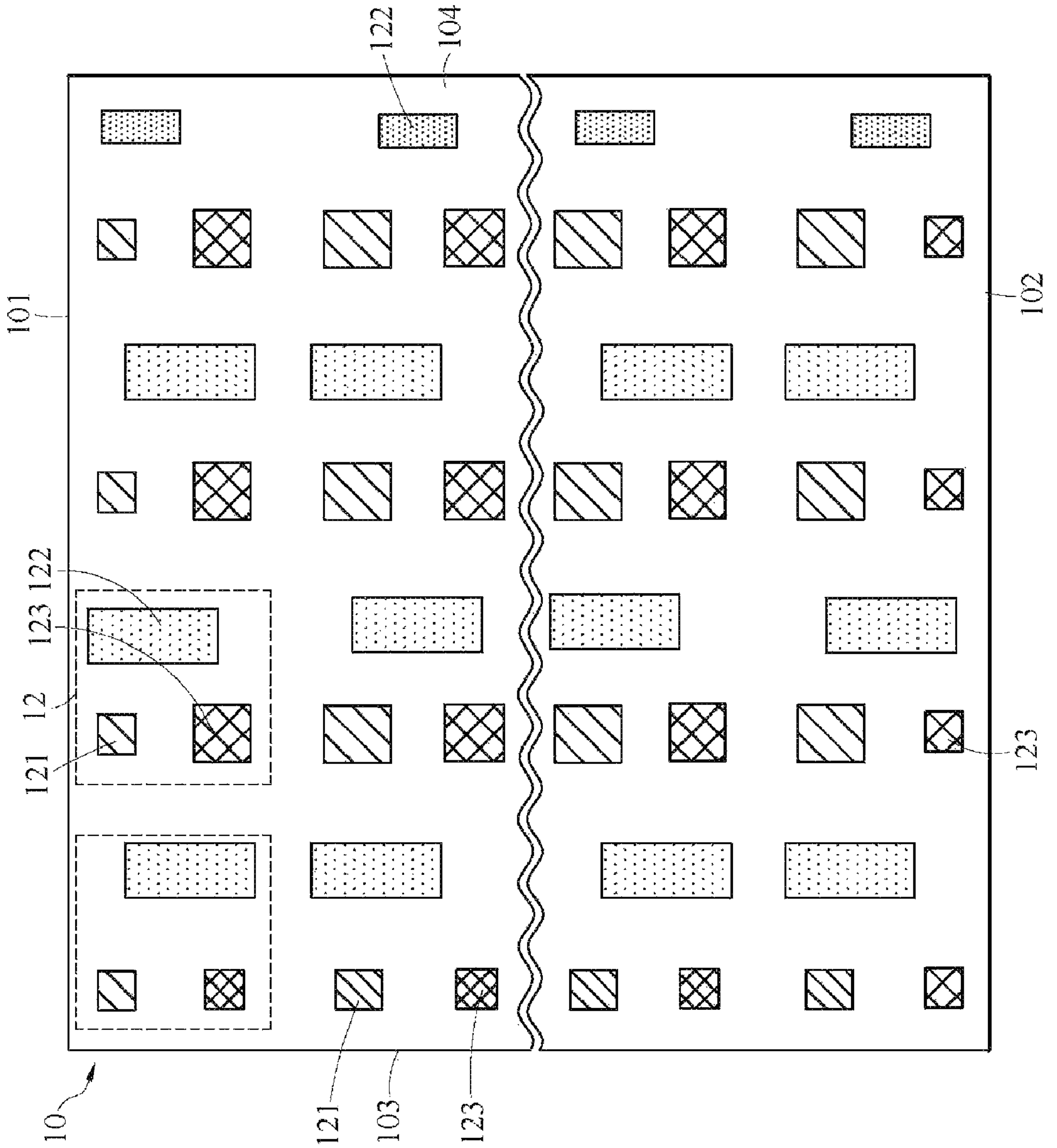
FIG. 4 is a schematic structural diagram of a display panel for adjusting areas of sub-pixels according to another embodiment of the disclosure.

Moreover, the method for adjusting the areas in the disclosure is applicable not only to the first edge 101 (upper edge) and the second edge 102 (lower edge) of the display panel 10, but also to the third edge 103 (left edge) and the fourth edge 104 (right edge) of the display panel 10. Referring to FIG. 4, the method in the disclosure is to perform pixel adjustment on the pixel units 12 at the edges of the display panel 10 to adjust the areas of the first sub-pixel 121, the second sub-pixel 122, and the third sub-pixel 123 at the edges. The areas of the first sub-pixel 121 at the first edge 101 (upper edge) of the display panel 10 and the second edge 102 (lower edge) of the display panel 10, the third sub-pixel 123, the first sub-pixel 121 and the third sub-pixel 123 at the third edge 103 (left edge) of the display panel 10, and the second sub-pixel 122 at the fourth edge 104 (right edge) of the display panel 10 are reduced, so that the first sub-pixel 121, the second sub-pixel, and the third sub-pixel at the edges have a smaller area. The areas of the first sub-pixel 121, the second sub-pixel 122, and the third sub-pixel 123 are reduced by at least 10%, to reduce the color edge phenomenon by reducing the sizes of the sub-pixels at the four edges.

Figure 5:
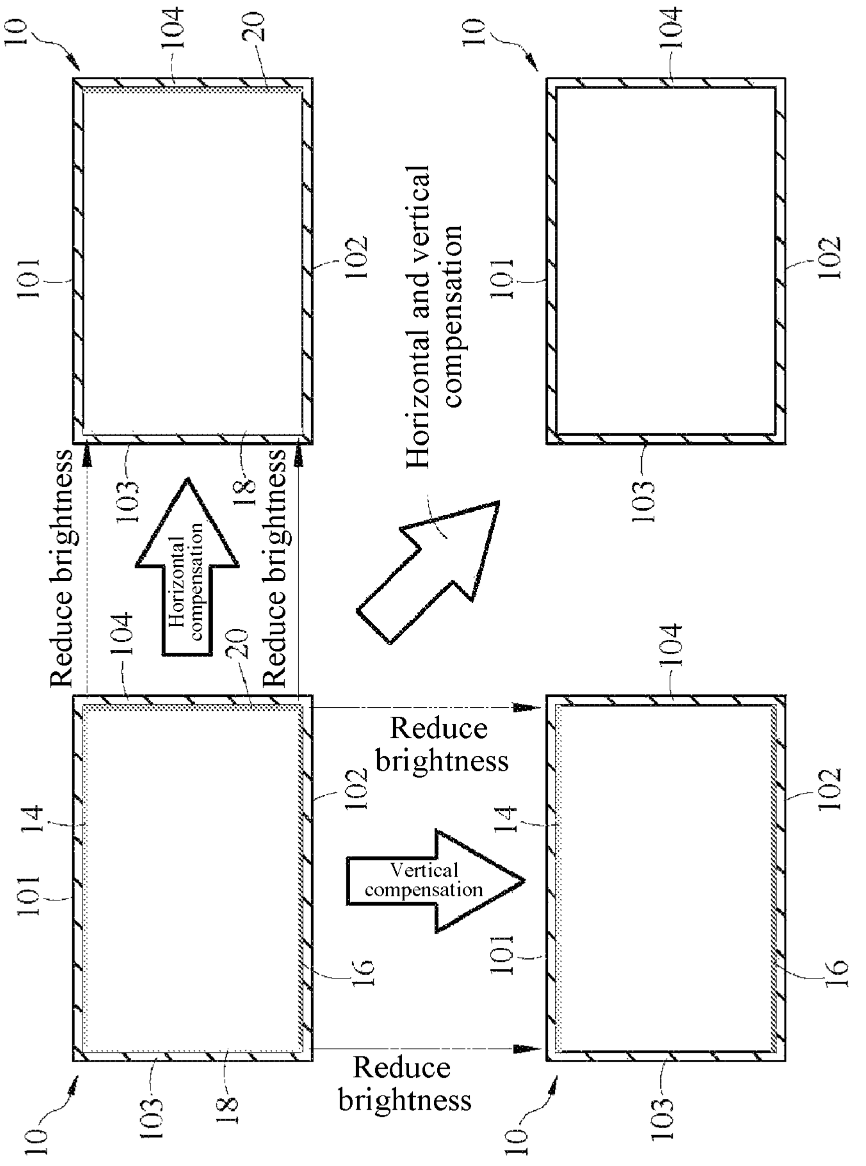
FIG. 5 is a schematic diagram of a display panel for adjusting brightness of sub-pixels according to an embodiment of the disclosure.

In the disclosure, the color edge of the window edge of the display panel is resolved by adjusting brightness of the sub-pixels. Referring to FIG. 1 and FIG. 5 together, the display panel 10 includes a plurality of pixel units 12, and each pixel unit 12 includes at least three sub-pixels: a first sub-pixel 121, a second sub-pixel 122, and a third sub-pixel 123. In this embodiment, the first sub-pixel 121 is a red sub-pixel, the second sub-pixel 122 is a blue sub-pixel, and the third sub-pixel 123 is a green sub-pixel. The method in the disclosure is to perform pixel adjustment on the pixel units 12 at the edges of the display panel 10 to adjust the brightness of the first sub-pixel 121, the second sub-pixel 122, and the third sub-pixel 123. The brightness of the first sub-pixel 121, the second sub-pixel 122, and the third sub-pixel 123 at the edges of the display panel 10 is reduced, so that the first sub-pixel 121, the second sub-pixel 122, and the third sub-pixel 123 at the edges have lower brightness. The brightness of the first sub-pixel 121, the second sub-pixel 122, and the third sub-pixel 123 is reduced by at least 10% (in an embodiment, the brightness is reduced by at least 10% to 50%). The adjustment value is further finely adjusted by the sensory effect of the human eyes. Moreover, when the brightness of the first sub-pixel 121, the second sub-pixel 122, and the third sub-pixel 123 at the edges of the display panel 10 is reduced, the brightness is reduced according to the edge position. Specifically, the disclosure reduces the brightness of the first sub-pixel 121 at the first edge 101 (upper edge) of the display panel 10 and the third sub-pixel 123 at the second edge 102 (lower edge) of the display panel 10 for horizontal compensation of the brightness, to eliminate a red edge 14 generated by the first edge 101 and a green edge 16 generated by the second edge 102. Moreover, the disclosure further reduces the brightness of the first sub-pixel 121 and the third sub-pixel 123 at the third edge 103 (left edge) of the display panel 10 and the second sub-pixel 122 at the fourth edge 104 (right edge) of the display panel 10 for vertical compensation of the brightness, to eliminate a yellow edge 18 generated by the third edge 103 and a blue edge 20 generated by the fourth edge 104. Definitely, the horizontal compensation and the vertical compensation for the display panel 10 simultaneously eliminate or reduce the red edge generated by the first edge 101, the green edge generated by the second edge 102, the yellow edge generated by the third edge 103, and the blue edge generated by the fourth edge 104.

In an embodiment, the display panel 10 is a display panel of a liquid crystal device (LCD), a display panel of a light-emitting diode (LED) display device, or a display panel of an OLED display device.

In the disclosure, during the adjustment of the brightness of the sub-pixels, software is used to adjust the color of the picture content to reduce the color edge phenomenon. Therefore, in the disclosure, a processing device, a timing controller (Tcon IC), or a scaler controller (scaler IC) is used to reduce the brightness of the sub-pixels at the edges of the display panel.

Figure 6:
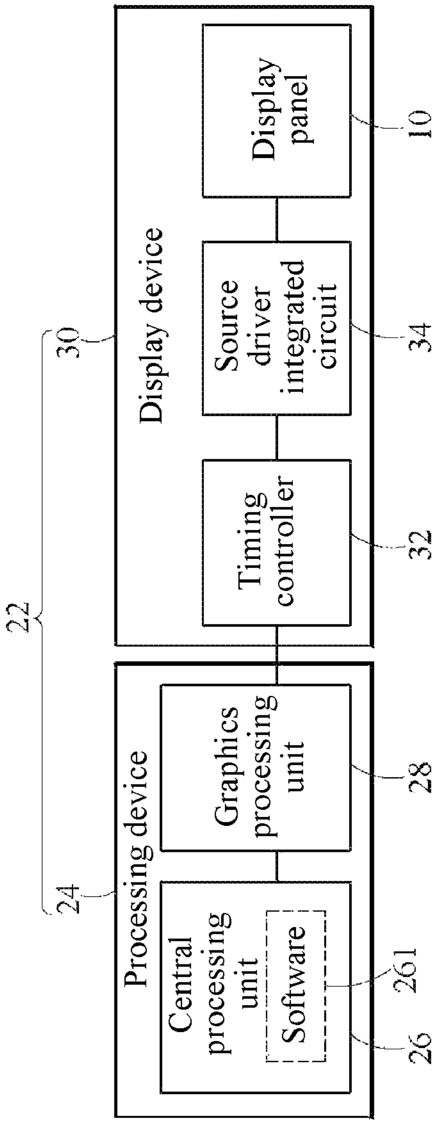
FIG. 6 is a schematic block diagram of an electronic device used for adjusting brightness according to an embodiment of the disclosure.

Referring to FIG. 6, an electronic device 22 includes a processing device 24 and a display device 30 electrically connected to the processing device 24. A central processing unit (CPU) 26 and a graphics processing unit (GPU) 28 are disposed in the processing device 24, the CPU 26 is electrically connected to the GPU 28, and software 261 is built in the CPU 26. The display device 30 includes a Tcon IC 32, a source driver integrated circuit (source driver IC) 34, and a display panel 10. The Tcon IC 32 is electrically connected to the GPU 28 and the source driver IC 34. The source driver IC 34 is electrically connected to the display panel 10.

In an embodiment, referring to FIG. 1, FIG. 5, and FIG. 6 together, in the disclosure, when the CPU 26 in the processing device 24 is used for compensation, an original picture is transmitted to the CPU 26. Therefore, the CPU 26 analyzes the original picture and calculates data such as the pixel chroma, then determines, by using the built-in software 261 according to a color lookup table (color LUT), whether the sub-pixels at the edges of the display panel 10 require compensation, and performs brightness compensation when edge compensation is required. The CPU 26 reduces the brightness of the sub-pixels around the display panel 10 through an algorithm to obtain a compensated picture, transmits the compensated picture to the display panel 10 through the GPU 28, the Tcon IC 32, and the source drive IC 34, and displays the compensated picture on the display panel 10. In this way, the human eyes see the compensated picture without color edges. Definitely, if the software 261 determines that the sub-pixels at the edges of the original picture requires no compensation, the original picture is transmitted directly to the display panel 10 for display.

In another embodiment, referring to FIG. 1, FIG. 5, and FIG. 6 together, in the disclosure, when the CPU 26 and the GPU 28 in the processing device 24 are used for compensation, an original picture is transmitted to the GPU 28 through the CPU 26. Therefore, the GPU 28 analyzes the original picture and calculates data such as the pixel chroma, then returns the data to the CPU 26, to determine, by using the built-in software 261 according to a color LUT, whether the sub-pixels at the edges of the display panel 10 require compensation, and performs brightness compensation when edge compensation is required. The CPU 26 reduces the brightness of the sub-pixels around the display panel 10 through an algorithm to obtain a compensated picture, transmits the compensated picture to the display panel 10 through the GPU 28, the Tcon IC 32, and the source drive IC 34, and displays the compensated picture on the display panel 10. In this way, the human eyes see the compensated picture without color edges.

In still another embodiment, referring to FIG. 1, FIG. 5, and FIG. 6 together, in the disclosure, when the Tcon IC 32 in the display device 30 is used for compensation, an original picture is transmitted to the CPU 26. The CPU 26 analyzes the original picture and calculates data such as the pixel chroma, and then transmits the data to the Tcon IC 32 through the GPU 28. The Tcon IC 32 determines, according to a color LUT, whether the sub-pixels at the edges of the display panel 10 require compensation, and performs brightness compensation when edge compensation is required. The Tcon IC 32 reduces the brightness of the sub-pixels around the display panel 10 through an algorithm to obtain a compensated picture, transmits the compensated picture to the display panel 10 through the source drive IC 34, and displays the compensated picture on the display panel 10. In this way, the human eyes see the compensated picture without color edges. Definitely, if determining that the sub-pixels the edges of the display panel require no compensation, the Tcon IC 32 directly transmits an original picture to the display panel 10 for display.

In addition, in addition to directly using the Tcon IC 32 in the display device 30 for compensation, the disclosure also uses the scaler IC for pixel compensation. The scaler IC has the same effect as the Tcon IC 32. Therefore, reference is made to the above description, and details are not repeated herein.

Therefore, the disclosure uses the software to adjust the pixel color of the picture to reduce the color edge phenomenon. This method makes a small change to hardware, and the required cost is relatively reduced.

In summary, the disclosure provides a method for reducing a color edge phenomenon of a display panel. The method is to reduce the color edge of the window or screen edge of the display panel by adjusting the positions, areas, or brightness of the sub-pixels in the pixel units at the edges of the display panel, so that human eyes see the correct color on visual effects after the chroma of the color edge is effectively adjusted, and then the color edge is homogenized by the human eyes, to avoid the color edge phenomenon of the edge pixels due to the overly unbalanced RGB chroma. Therefore, the disclosure effectively reduces or avoids the color edge phenomenon to improve the display effect of the display panel and user experience.

The above embodiments are merely to describe the technical ideas and characteristics of the disclosure to enable a person skilled in the art to understand the content of the disclosure and implement it accordingly, and are not used to limit the scope of the claims of the disclosure. That is, any equivalent change or modification made according to the spirit disclosed in the disclosure still falls within the scope of the claims of the disclosure.

What is claimed is:

1. A method for reducing a color edge phenomenon of a display panel, applicable to a display panel comprising a plurality of pixel units, and the method comprising:

performing pixel adjustment on the pixel units at edges of the display panel, wherein each pixel unit comprises at least three sub-pixels: a first sub-pixel, a second sub-pixel, and a third sub-pixel, to adjust positions, areas, or brightness of the sub-pixels;

wherein pixel adjustment on the pixel units at edges of the display panel comprises eliminating a red edge generated by a first edge of the display panel, a green edge generated by a second edge of the display panel, a yellow edge generated by a third edge of the display panel, and a blue edge generated by a fourth edge of the display panel by reducing the brightness of the sub-pixels at the edges of the display panel; and wherein the sub-pixels with the reduced brightness comprise:

the first sub-pixel at the first edge of the display panel and the third sub-pixel at the second edge of the display panel for horizontal compensation of the brightness; and the first sub-pixel and the third sub-pixel at the third edge of the display panel and the second sub-pixel at the fourth edge of the display panel for vertical compensation of the brightness.

2. The method for reducing a color edge phenomenon of a display panel according to claim 1, wherein the step of adjusting the positions of the sub-pixels further comprises:

adjusting the sub-pixels of the display panel to be alternately arranged, so that the sub-pixels at the edges are arranged uniformly to present an ordered alternate arrangement of the first sub-pixel, the second sub-pixel, and the third sub-pixel.

3. The method for reducing a color edge phenomenon of a display panel according to claim 2, wherein a brightness ratio of the first sub-pixel, the second sub-pixel, and the third sub-pixel is 1:1:1.

4. The method for reducing a color edge phenomenon of a display panel according to claim 2, wherein the first sub-pixel is a red sub-pixel, the second sub-pixel is a blue sub-pixel, and the third sub-pixel is a green sub-pixel.

5. The method for reducing a color edge phenomenon of a display panel according to claim 1, wherein the step of adjusting the areas of the sub-pixels further comprises:

reducing the areas of the sub-pixels at the edges of the display panel, so that the sub-pixels at the edges have smaller areas.

6. The method for reducing a color edge phenomenon of a display panel according to claim 5, wherein the areas of the sub-pixels are reduced by at least 10%.

7. The method for reducing a color edge phenomenon of a display panel according to claim 5, wherein the sub-pixels with the reduced areas comprise at least the first sub-pixel at a first edge of the display panel and the third sub-pixel at a second edge of the display panel.

8. The method for reducing a color edge phenomenon of a display panel according to claim 7, wherein the sub-pixels with the reduced areas further comprise the first sub-pixel and the third sub-pixel at a third edge of the display panel, and the second sub-pixel at a fourth edge of the display panel.

9. The method for reducing a color edge phenomenon of a display panel according to claim 8, wherein the first sub-pixel is a red sub-pixel, the second sub-pixel is a blue sub-pixel, and the third sub-pixel is a green sub-pixel.

10. The method for reducing a color edge phenomenon of a display panel according to claim 8, wherein the first edge is an upper edge of the display panels, the second edge is a lower edge of the display panels, the third edge is a left edge of the display panel, and the fourth edge is a right edge of the display panel.

11. The method for reducing a color edge phenomenon of a display panel according to claim 1, wherein the brightness of the sub-pixels is reduced by at least 10%.

12. The method for reducing a color edge phenomenon of a display panel according to claim 1, wherein the first sub-pixel is a red sub-pixel, the second sub-pixel is a blue sub-pixel, and the third sub-pixel is a green sub-pixel.

13. The method for reducing a color edge phenomenon of a display panel according to claim 1, wherein the first edge is an upper edge of the display panels, the second edge is a lower edge of the display panels, the third edge is a left edge of the display panel, and the fourth edge is a right edge of the display panel.

14. The method for reducing a color edge phenomenon of a display panel according to claim 1, wherein in the step of adjusting the brightness of the sub-pixels, a processing device, a timing controller, or a scaler controller is used to reduce the brightness of the sub-pixels at the edges of the display panel.

* * * * *